Patented Nov. 17, 1925.

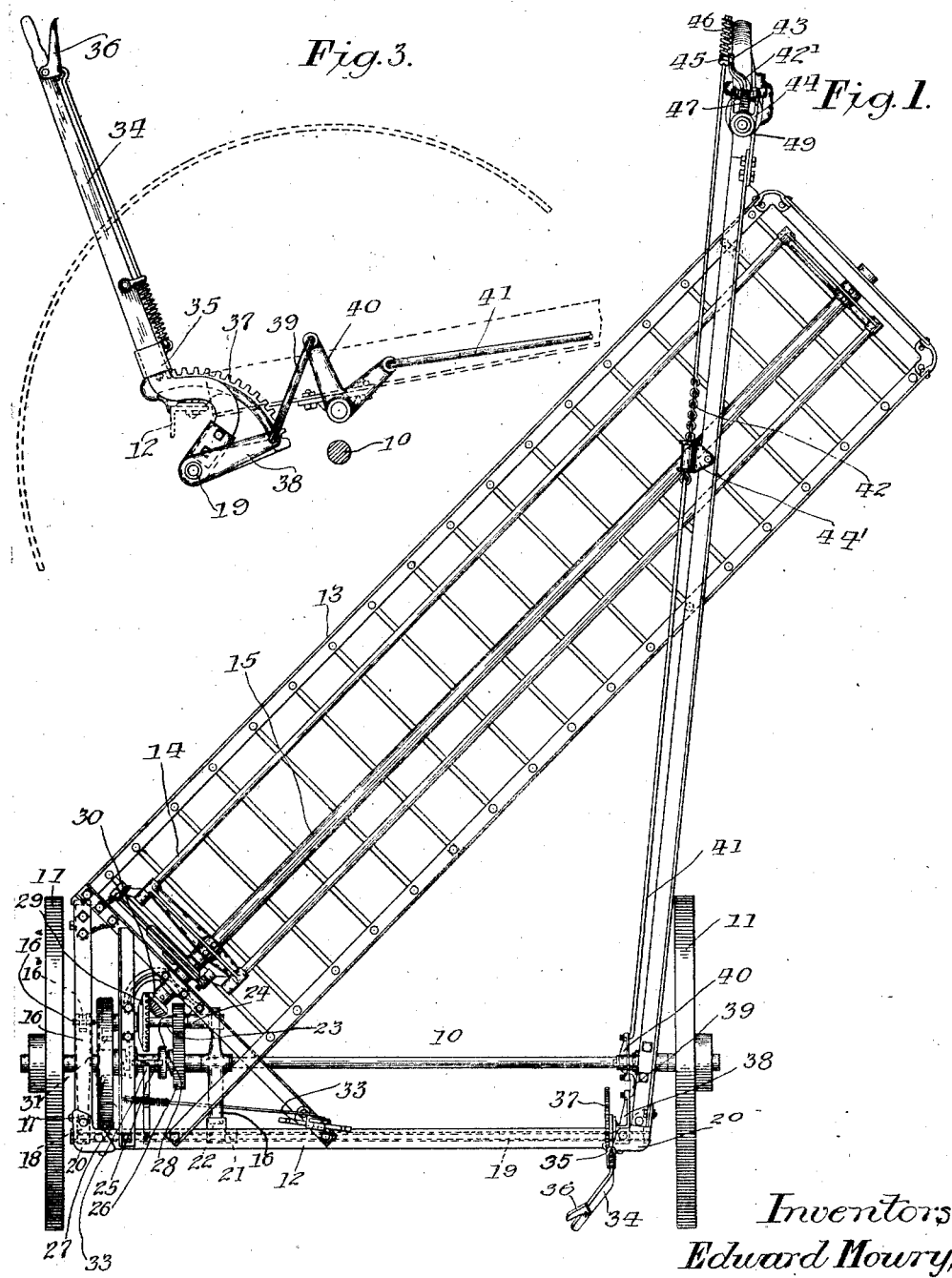

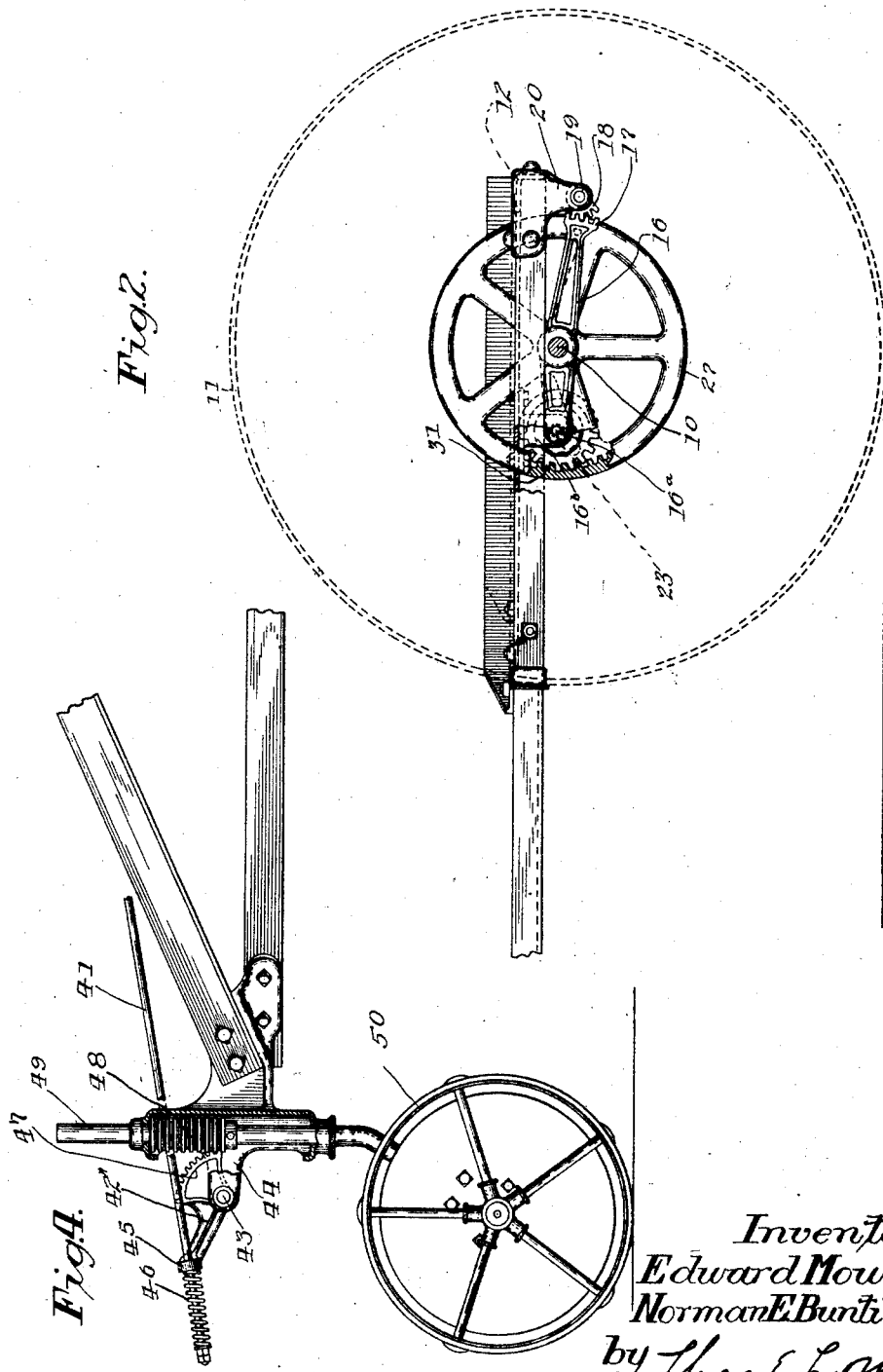

1,561,562

UNITED STATES PATENT OFFICE.

EDWARD MOWRY, OF STERLING, AND NORMAN E. BUNTING, OF CHICAGO, ILLINOIS, ASSIGNORS, BY MESNE ASSIGNMENTS, TO INTERNATIONAL HARVESTER COMPANY, A CORPORATION OF NEW JERSEY.

COMBINED RAKE AND TEDDER.

Application filed July 29, 1918. Serial No. 247,322.

*To all whom it may concern:*

Be it known that we, EDWARD MOWRY and NORMAN E. BUNTING, citizens of the United States, and residents, respectively, of Sterling, in the county of Whiteside and State of Illinois, and of Chicago, in the county of Cook and State of Illinois, have invented certain new and useful Improvements in Combined Rakes and Tedders, of which the following is a full, clear, and exact specification.

This invention relates to side delivery hay rakes and machines of this character, and more particularly to means for adjusting the frame of the rake with respect to the ground.

The object of the invention is to provide a construction in which the position of the raking elements or operative elements with respect to the ground, may be varied easily and quickly.

Another object is to provide a construction having few parts, and a construction which will be efficient in operation and inexpensive to manufacture.

A further object is to provide a resilient frame mounting or support whereby the frame is adapted to follow the inequalities of the ground without sustaining undue strains.

With these and other objects in view which will appear as the description proceeds, our invention comprises a rake frame mounted upon a main axle, and of means for vertically adjusting the frame on said axle and with respect to the ground.

One embodiment of the invention is illustrated in the accompanying drawings, and in these drawings,—

Figure 1 shows a top plan view of our improved construction;

Fig. 2 is a view in elevation on an enlarged scale and partly in section, illustrating the frame adjusting mechanism utilized at the inner or forward end of the rake frame;

Fig. 3 is an enlarged detail view showing in elevation the frame adjusting lever; and Fig. 4 is an enlarged elevational view partly in section showing the adjusting mechanism for the outer or rear end of the raking frame.

The machine in connection with which our invention is shown is provided with the usual main axle 10, having carrying wheels 11 secured thereto, the rake frame comprising the usual transversely disposed frame 12 and the diagonal rearwardly extending frame 13, the latter frame carrying a raking cylinder 14 mounted upon the rake shaft 15. The axle 10 has pivoted thereon a plurality of frame adjusting levers 16, two of these levers being shown in the drawings, the levers being pivotally connected to the axle intermediate their front and rear ends. The rear ends of these levers are pivotally connected to the frame of the rake, the lever adjacent the left hand carrying wheel (see Fig. 1) being pivoted on a pin $16^a$ carried by a downwardly extending bracket member $16^b$ secured to the rake frame. The front end of this lever is provided with a toothed sector 17 which meshes with a toothed quadrant 18 fixed to a rock shaft 19 journaled in brackets 20 carried by the front frame member. The other frame adjusting lever shown intermediate the carrying wheels is also pivoted on the axle 10 and carries at its front end a toothed sector 21 meshing with a toothed quadrant 22 carried by the shaft 19, these elements being exactly similar to those described in connection with the first named frame adjusting lever. This lever is pivotally mounted on a stub shaft 23 carried by a bracket 24 bolted to the machine frame.

The driving mechanism for the rake may be of any desired construction, the drawings in this application illustrating a drive for the combined side delivery rake and tedder, comprising a reciprocable clutch member 25 splined on the axle 10 and having clutch teeth adapted to mesh with corresponding clutch teeth carried by gears 26 and 27 loosely mounted on the axle. The gear 26 meshes with a gear 28 carried by the stub shaft 23 above described, this shaft also having secured thereto a gear 29 which in turn meshes with a bevel gear 30 carried by the rake shaft 15. The gear 27 which as described is loosely mounted on the axle 10, is provided with internal gear teeth meshing with a gear 31 also carried by the shaft 23. Clutch shifting mechanism 33 of any desired character may be employed.

From the above description it will be seen that the shifting of the clutch into engagement with the gear 26 will drive the rake shaft through intermediate gears 28, 29 and 30, in one direction, and the shaft of the clutch into engagement with the gear 27 will drive the rake shaft through intermediate gears 31, 29, and 30, in the opposite direction. It should be understood, however, that the particular manner of driving the rake shaft has nothing to do with the present invention and that any other suitable form of driving mechanism may be employed, the one illustrated in the drawings being shown merely for the purpose of showing a practical working machine.

The transverse shaft 19 which carries the quadrants 18 and 22 as above described, is provided at its right-hand end (see Fig. 1) with a lever 34 which is fixedly secured to the shaft and is provided with a pawl 35 and pawl releasing means 36, the pawl coacting in the well known manner with a toothed quadrant 37 fixed to the frame of the machine. A crank arm 38 is also secured to the shaft 19 adjacent the lever and this crank arm is connected by a link 39 to a bell crank lever 40 pivoted to the machine frame. The opposite end of the bell crank lever 40 is connected by link 41 having a chain 42 intermediate its ends, to a bell crank lever 42' pivoted at 43 to a bracket 44 carried by the rear end of the rake frame. A guide member 44' is secured to the rake frame for the purpose of guiding the chain portion of the link 41. The rear end of the link 41 is slidably mounted in a projection 45 swiveled to the bell crank lever 42' and carries between its rear end and the projection 45 a spring 46 normally forcing the link 41 in a rearward direction. The bell crank lever 42' is provided with a toothed sector 47 which meshes with the teeth of a circular rack 48 secured to a vertical spindle or support 49 journaled in suitable bearings in the bracket 44 and carrying at its lower end a castor wheel 50 of any suitable construction. The bracket 44 is provided with a suitable casing which partially surrounds the rack 48 and a portion of the spindle 49 to prevent the dust and dirt and other foreign matter from gaining access to the rack and spindle.

Having described the construction of our improved frame adjusting mechanism, the operation of this mechanism will be briefly set forth. When the operator desires to adjust the rake frame with respect to the ground, the lever 34 is actuated, thereby rotating the shaft 19, quadrants 18 and 22 and adjusting lever 16. As these levers 16 are adjusted the frame will be raised and lowered on the axle 10 which extends through the central portions of the levers. Simultaneously with the adjustment of the lever 16 the link 41 will be actuated by means of the lever 34 and the bell crank lever 42' will be swung on its pivot, thereby raising or lowering the frame by means of the connection between the quadrant 47 and the circular rack 48. The circular rack 48 and spring 46 permit the castor wheel to change its direction and to follow the inequalities of the ground without sustaining undue strain. To more specifically state the operation of raising the frame with respect to the ground, the operator swings the lever 34 rearwardly and through the arm 38, connection 39 and crank 40, the connecting link 41 is drawn forwardly which in turn swings the quadrant 47 forwardly about its pivot 43 and thereby elevates the frame. From the above description it will be seen that we have provided an exceedingly simple and efficient construction for accomplishing the purpose desired, and a construction which can be easily and quickly manipulated to obtain the desired adjustment.

While we have in the above specification described one embodiment which our invention may assume, it should be understood that the invention is capable of modification and that modifications may be employed without departing from the spirit and scope of the invention as expressed by the following claims.

We claim—

1. In a hay rake, the combination of a frame, raking means supported on the frame, an axle having carrying wheels, a pair of levers pivoted at one end to the frame and midway of their ends to the axle, a rock shaft on the frame, and cooperating means on said rock shaft and the other ends of said levers adapted to be actuated for bodily and vertically adjusting the frame and raking means with respect to said axle.

2. In a hay rake, the combination of a frame, raking means supported on the frame, an axle having carrying wheels, a pair of levers pivoted at one end to the frame and midway of their ends to the axle, said levers being disposed at one side of the longitudinal center of the machine, a rock shaft on the frame, and cooperating gear elements on the rock shaft and the other ends of the levers adapted to be actuated for bodily and vertically adjusting the frame and raking means with respect to said axle.

3. In a hay rake, the combination of a frame, raking means supported on the frame, an axle and carrying wheels for supporting the front end of the frame, wheel means for supporting the rear end of the frame, levers pivoted at one end to the frame and intermediately of their ends to the axle, a rock shaft on the frame, cooperating means on the rock shaft and the other ends of said levers adapted to be actuated for adjusting the front end of the frame and raking means with respect to the axle, means for adjusting the rear end of the frame and raking means with respect to the rear wheel means, and single means for simultaneously actuating all of said adjusting means.

In testimony whereof we affix our signatures.

EDWARD MOWRY.
NORMAN E. BUNTING